Figure 1:
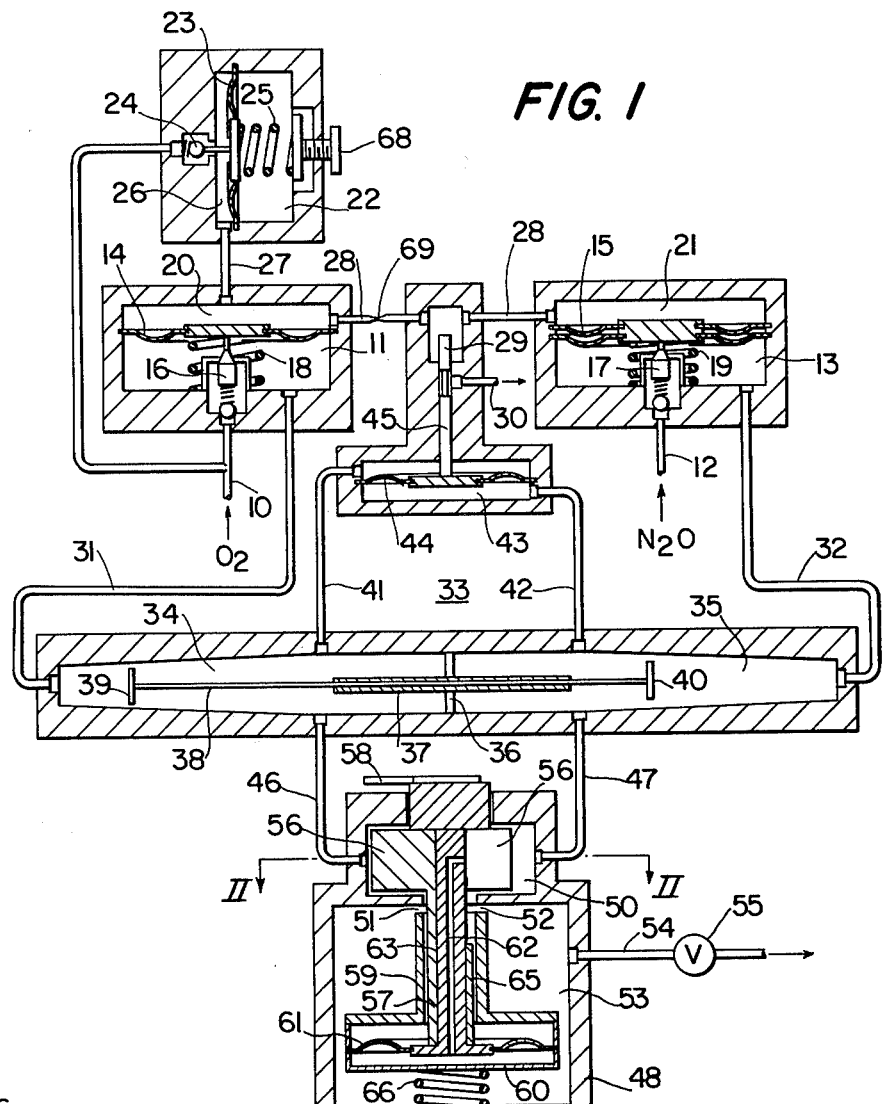

United States Patent [19]

Westberg

[11] 4,254,789
[45] Mar. 10, 1981

[54] APPARATUS FOR MIXING MEDIA, SUCH AS GASES OR LIQUIDS

[75] Inventor: Johan E. H. Westberg, Lidingö, Sweden

[73] Assignee: AGA Aktiebolag, Lidingö, Sweden

[21] Appl. No.: 9,365

[22] Filed: Feb. 5, 1979

[30] Foreign Application Priority Data

Feb. 23, 1978 [SE] Sweden .............................. 7802089

[51] Int. Cl.³ ............................................ G05D 11/03
[52] U.S. Cl. ...................................... 137/88; 137/100
[58] Field of Search ................... 137/100, 101, 99, 88; 128/203.14, 203.25

[56] References Cited

U.S. PATENT DOCUMENTS

| | | | |
|---|---|---|---|
| 3,528,418 | 9/1970 | Grosholz | 128/203.14 X |
| 3,534,753 | 10/1970 | Ollivier | 137/88 X |
| 3,605,785 | 9/1971 | Dobritz | 137/101 |
| 3,727,627 | 4/1973 | Bird et al. | 137/100 |
| 3,739,799 | 6/1973 | Bickford et al. | 137/100 |
| 3,747,600 | 7/1973 | Andersson | 128/203.25 |
| 3,896,837 | 7/1975 | Rohling | 128/203.25 |
| 3,973,579 | 8/1976 | Ollivier | 137/100 |

*Primary Examiner*—Daniel M. Yasich
*Attorney, Agent, or Firm*—Larson, Taylor and Hinds

[57] ABSTRACT

In an apparatus for mixing in given proportions two media, such as gases or liquids, the pressure of each said media is reduced to a working pressure by a respective regulator. The media from the regulators pass through a mixing means to a common mixing chamber through two gaps each of which is individual to a respective medium. The relationship between the length of the two gaps can be adjusted by means operative to control the proportions of the media in said mixture and the regulators are arranged to be controlled in a manner such that the pressures of the media before the gaps are held mutually equal.

7 Claims, 2 Drawing Figures

APPARATUS FOR MIXING MEDIA, SUCH AS GASES OR LIQUIDS

The present invention relates to an apparatus for mixing in given proportions two media, such as gas or liquid, charged to the apparatus under pressure, in which it is assumed that the pressure of the media is reduced to a working pressure by regulators incorporated in each of the respective supply lines for the two media. The apparatus includes a common mixing chamber and the media are arranged to pass from the regulators through two gaps which are separate for each of the media. Such apparatus are previously known, but hitherto have only been usable, for example, for indicating the relationship between the quantities of two gases supplied to the mixing chamber.

In medical applications, it may be desirable to mix, for example, the gases oxygen and air or oxygen and nitrous oxide (laughing gas), and it is consequently most desirable that the gases are mixed highly accurately and at a given pressure and that the proportions between the components in the resultant gaseous mixture can be read-off directly as a percentage of the one gas in said mixture.

The aforementioned high and stable pressure in the gaseous mixture obtained from the mixer is of high value, since the gaseous mixture is able in this way to operate other apparatus, such as humidifiers, and since a flow meter connected directly to the apparatus indicates directly the correct value without it being necessary to compensate for variations in the pressure. In the case of medical applications, high requirements are placed on the operational range, since the apparatus may be required to deliver a gas flow of from one liter/minute to 120 liters/minute, and since the percentage of one component of the gaseous mixture may vary between 1–99%. Gas mixers known hitherto have not been able to fulfil these requirements.

The mixer according to the invention is based on a co-operating system of components which, for all working conditions, provide the same pressure drop over a metering gap for the two components irrespective of the mixing ratio. Further, there is obtained an unchanged, either laminar or turbulent flow at all gas flows, and an adjustable pressure drop over said gap.

Figure 2:
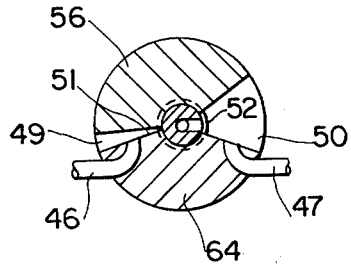

So that the invention will be more readily understood and optional features thereof made apparent, an embodiment of the invention will now be described with reference to the accompanying schematic drawings, in which FIG. 1 illustrates the components forming part of the apparatus, and FIG. 2 is a sectional view taken on the line II—II in FIG. 1.

The illustrated apparatus is intended for mixing oxygen with nitrous oxide, although it can in principle also be used for mixing other gases, or liquids. One of the gases, in this case oxygen, is passed through a supply line 10 to a first regulator 11, and the other gas, in this case nitrous oxide, is passed through a second supply line 12 to a second regulator 13. Each of the regulators includes a respective valve 16 and 17 in respective supply lines 10 and 12, each of said valves being controlled by a respective diaphragm or membrane 14 and 15. The valves 16 and 17 are held closed by respective springs 18 and 19 acting on a respective diaphragm 14 or 15, said springs being dimensioned such that the spring 18 is stronger than the spring 19. The valves 16 and 17 can be opened by applying pressure on that side of respective diaphragms 14 and 15, which is opposite to the side against which the springs 18 and 19 act, this pressure in the present case being that exerted by a control gas in diaphragm chambers 20 and 21. In the illustrated embodiment, the control gas is taken from the supply line 10 and, with the aid of a control regulator 22, the control pressure prevailing in the diaphragm chambers 20 and 21 is maintained constant under all regulating conditions.

The control regulator 22 includes an inlet valve 24 which is actuated by a diaphragm 23, a spring 25 arranged in the control regulator 22 attempting to open the valve 24. In this way, the control gas enters a diaphragm chamber 26 which lies on the side of the diaphragm 23 opposite to that against which the spring 15 acts. The pressure in the diaphragm chamber 26 attempts to close valve 24, whereby the control pressure in the diaphragm chamber 26 is held constant. Optionally, the control pressure can be made adjustable by changing the force of the spring 25 in a manner known per se, for example by means of a setting screw 68 illustrated in the figure.

The diaphragm chamber 26 is connected directly with the diaphragm chamber 20 in regulator 11, through a line 27. The control pressure in the diaphragm chamber 20 strives to open the valve 16 and the regulator 11 will be adjusted such that the gas pressure beneath the diaphragm 14 together with the force of the spring 18 balance out the control pressure in the diaphragm chamber 20. As a result hereof, the gas pressure beneath the diaphragm 14 will be held constant under all regulating conditions.

The diaphragm chamber 20 in regulator 11 is connected with the diaphragm chamber 21 in regulator 13 by means of a line 28 having a restriction 69 incorporated therein. In addition, that the line 28 can be connected through a relief valve 29 to a relief line 30 which exhausts to the surroundings. When the valve 29 is closed, the same control pressure will prevail in both of the diaphragm chambers 20 and 21, and, since the spring 19 is weaker than the spring 18, the working pressure beneath the diaphragm 15 in regulator 13 will be higher than the working pressure beneath the diaphragm 14 in regulator 11. If, on the other hand, the valve 29 is partially opened, the control pressure in the diaphragm chamber 21 will fall and therewith also the working pressure beneath the diaphragm 15 in regulator 13. Consequently, the said working pressure in the regulator 13 can take all values from a value which is considerably higher than the working pressure in the regulator 11, down to zero, depending upon the setting of the valve 29.

As indicated in the drawing, the membrane or diaphragm 15 may be doubled to prevent gas from one supply line penetrating directly into the other supply line. The check valves illustrated beneath the valves 16 and 17 serve the same purpose.

The two gas flows are passed from the regulators 11 and 13 through passages 31 and 32 to a percentage meter 33. This meter comprises two conical measuring tubes 34 and 35 which are joined together at the wide ends thereof. The measuring tubes are separated by an intermediate wall 36, which carries an elongate cannula 37. Arranged in the central bore of the cannula is a straight, rigid wire 38 which can readily be moved forwards and backwards in its axial direction. The wire 38 carries in each measuring tube a measuring body 39 and 40 respectively, said bodies being held at a constant distance apart by the wire 38.

Lines 41 and 42 extend from the inner sections of the measuring tubes 34 and 35 to a balancing means 43. The balancing means comprises a diaphragm chamber having a diaphragm 44 arranged to control the valve 29 in the relief line 20 through a rod 45. Each of the pressures in the inner sections of the two measuring tubes 34 and 35 act in the balancing means 43 on a respective side of the diaphragm 44 in a manner such as to balance the pressures against each other. If one of said pressures should exceed the other, the valve 29 is opened or closed to a greater or lesser extent, thereby affecting the pressure of the gas passed to the measuring tube 35 through the regulator 13. As a result hereof the pressures in the inner sections of the two measuring tubes will be equal to one another. Since the measuring bodies are mechanically coupled, drops in pressure across the two measuring bodies 39 and 40 will also be equal to one another. With corrections for the difference in the viscosity of the gases, the gap between the measuring bodies and the inner walls of the measuring tubes 34 and 35 will be maintained in proportion to the gas flows, irrespective of the absolute values thereof. Consequently, the tubes can be graduated to show the percentage-contents of one gas in the gaseous mixture obtained from the apparatus.

The gases are passed from the measuring tubes 34 and 35 to a mixing means 48 through wide and short passages 46 and 47. The mixing means 48 includes two inlet chambers 49 and 50 (FIG. 2) into which the two inlet lines 46 and 47 discharge. Because of the balancing means 43, the pressures in the two sector shaped inlet chambers will be equal when the pressures in the inner sections of the two measuring tubes are equal. The inlet chambers 49 and 50 communicate with a common mixing chamber 53 via two gaps 51 and 52, from which chamber the gaseous mixture is removed through a line 54. A regulating valve 55 for setting the total gas flow may be arranged in said line 54, as shown.

The two gaps or openings 51 and 52 are shown from above in FIG. 2 and the mutual relationship between one dimension, e.g., the lengths, of these gaps can be regulated by means of a sector-shaped body 56 which can be turned about a central, fixed (non-rotatable) shaft 57. The sector-shaped body or rotatable member 56 can be turned by means of a knob 58 such that the ratio between the area of one of the outflow openings through the gaps 51 and 52 to the area of the sum of the outflow openings can be set from 0 to 100%.

When the gap openings 51 and 52 are to be of a size such that a suitable pressure drop is obtained with maximum flow, the pressure drop with low flow rates will be too small. Because of this accuracy in the flow ratio would be too low. Further, this accuracy would also be too low with respect to the pressure accuracy of the balancing means. Because of this, the apparatus is constructed so that a relatively constant pressure drop is obtained when the setting of the percentage of one gas in the resultant gaseous mixture is left unchanged. This constant drop in pressure is created by the fact that a second dimension, e.g., the width, of the gaps 51 and 52 increases with increasing flow through the gaps. One of the edges defining said gaps is formed by the upper end of a cylinder 59 which is fixedly connected to the housing of a diaphragm chamber 60. Arranged in the chamber 60 is a diaphragm 61 which is connected at its center to the fixed shaft 57, the space beneath the diaphragm 61 communicating through a passage 62, with one of the inlet chambers, i.e., in the illustrated embodiment, the chamber 50. The same constant pressure as that prevailing in the inner chamber 50 will also prevail beneath the diaphragm 61.

As illustrated, the sector-shaped body 56 is provided with a neck 63 which extends down into the space between the fixed shaft 57 and the cylinder 59. Similarly, the fixed sector-shaped body 64 (FIG. 2) may also be provided with a neck which also extends down into said space. Since the two necks do not encompass the whole of the circumference around the shaft 57, a fixed sleeve 65 is arranged around said shaft in sealing abutment therewith and with the cylinder 59 in a manner such that the gas pressure before the gaps 51 and 52 is unable to affect the pressure above the diaphragm 61.

If the gas taken out from the mixing means 48 through the valve 55 increases, the pressure in the mixing chamber 53, and therewith also in the space above the diaphragm 61, will decrease. As beforementioned, the pressure beneath the diaphragm 61 is constant. Since the diaphragm 61 is fixed, the diaphragm housing 60 will be urged downwardly as a result thereof, such as to increase the width of the gaps 51 and 52. A spring 66 strives to move the diaphragm housing 60 upwardly, and if the spring is made very soft the width of the gaps is set so that the pressure drop across said gaps is practically constant irrespective of the flow. It is also possible, however, for the spring 66 to have a relatively high spring constant and in such case the pressure drop across the gaps 51 and 52 can be utilized to provide an indication of the total flow in a flow meter coupled above the gaps. The pressure drop across the gaps 51 and 52 must not, however, be changed such that the flow through the gap changes in character from a laminar flow to a turbulent flow, or vice versa, since this would impair the accuracy of the apparatus.

By means of the described apparatus it is possible to obtain a desired mixing ratio, and thus a desired percentage of the one gas in the resultant gaseous mixture, by correspondingly setting the sector-shaped body 56 in a manner such that one gap 51 or 52 is made longer and the other shorter to a corresponding degree. The resistance to the flow of the gases through the gaps 51 and 52 is changed as a result hereof, but the regulators 11 and 13, in co-operation with the balancing means 43, constantly maintain mutually equal pressures in the two inlet chambers 49 and 50 of the mixing means 48 under all flow conditions. Consequently, a given setting of the sector-shaped body 56 will correspond to a given percentage of one of said gases. The knob 58 may be marked to show the mixing ratio directly.

What is claimed is:

1. An apparatus for mixing two fluids in given proportions, said apparatus comprising first and second regulators, incorporated in respective supply lines for the two fluids, for reducing the fluid pressure of each of the two fluids to an operating pressure, and mixing means, including a common mixing chamber for receiving the fluids from said first and second regulators, said mixing means including first and second openings for controlling the flow of the respective fluid into said mixing chamber, and said apparatus further comprising means for controlling said first and second regulators such that the fluid pressures of the two fluids are equalized upstream of said openings, said mixing means further including control means for controlling the proportions of the two fluids passing through said first and second openings, said control means including a rotatable member whose angular position controls one dimension of the first and second openings ao as to control the proportions of the fluid, said mixing means further comprising flow responsive adjustment means for simultaneously providing the same change in a second dimension of said first and second openings in response to the total flow through said openings.

2. An apparatus according to claim 1, further comprising a balancing means for detecting the pressure of the fluids passed to the mixing means and for controlling the regulators in dependence upon the detected pressure of said fluids in a manner such that the pressures in a pair of inlet chambers of said mixing means are mutually equal.

3. An apparatus according to claim 1, wherein the flow responsive adjustment means for adjusting said second dimension of said openings is arranged to regulated said second dimension in a manner such that the pressure drop across the openings increases linearly with the total flow through said openings.

4. An apparatus according to claim 3, wherein said flow responsive adjustment means includes a diaphragm chamber, connected such that the pressure on one side of a diaphragm arranged in the diaphragm chamber is dependent upon the total flow through the openings, the diaphragm being connected to one of walls defining said openings in a manner such that a decrease in pressure of said one side of the diaphragm in the diaphragm chamber causes said second dimension of said opening to increase.

5. An apparatus according to claim 1, wherein an indicating means is connected between the regulators and the mixing means for respectively indicating the relationship between the flow of the two fluids to the mixing means.

6. An apparatus according to claim 5, characterized in that the indicating means comprises a pair of chambers each having a measuring body disposed therein, said bodies being mechanically joined together.

7. An apparatus according to claim 1 wherein said mixing means includes a centrally located common passageway to said common mixing chamber and said rotatable member cooperates with a fixed member to define a pair of generally sector shaped inlet chamber which communicate, at the narrow ends of the sector shaped chambers, with said common passageway, the angular position of said rotatable member determining the width of the openings of said inlet chambers to said common passageway.

* * * * *